Figure 2:
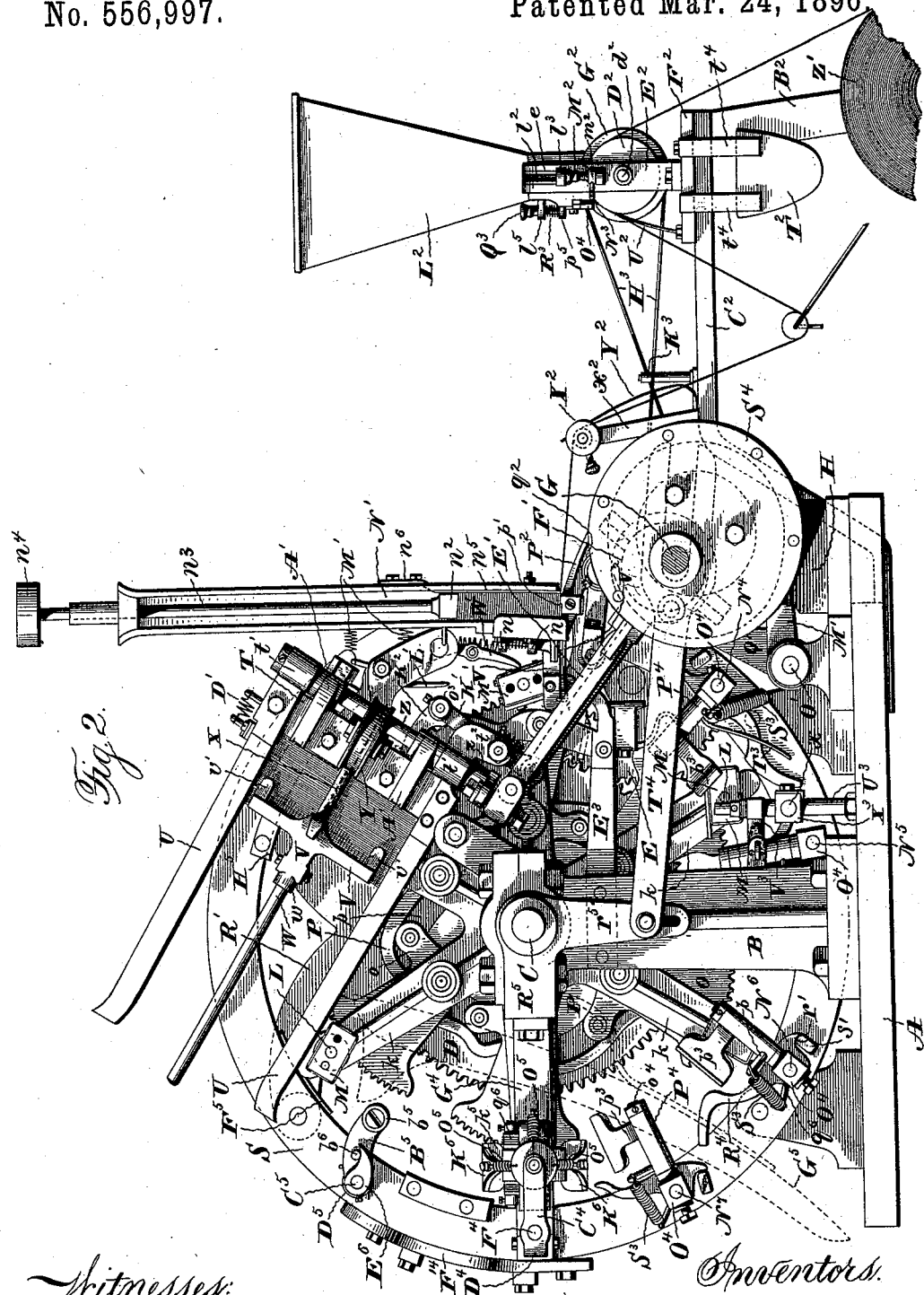

(No Model.) 16 Sheets—Sheet 1.
C. LOYENS & A. PAULSON.
BOX MAKING MACHINE.
No. 556,997. Patented Mar. 24, 1896.
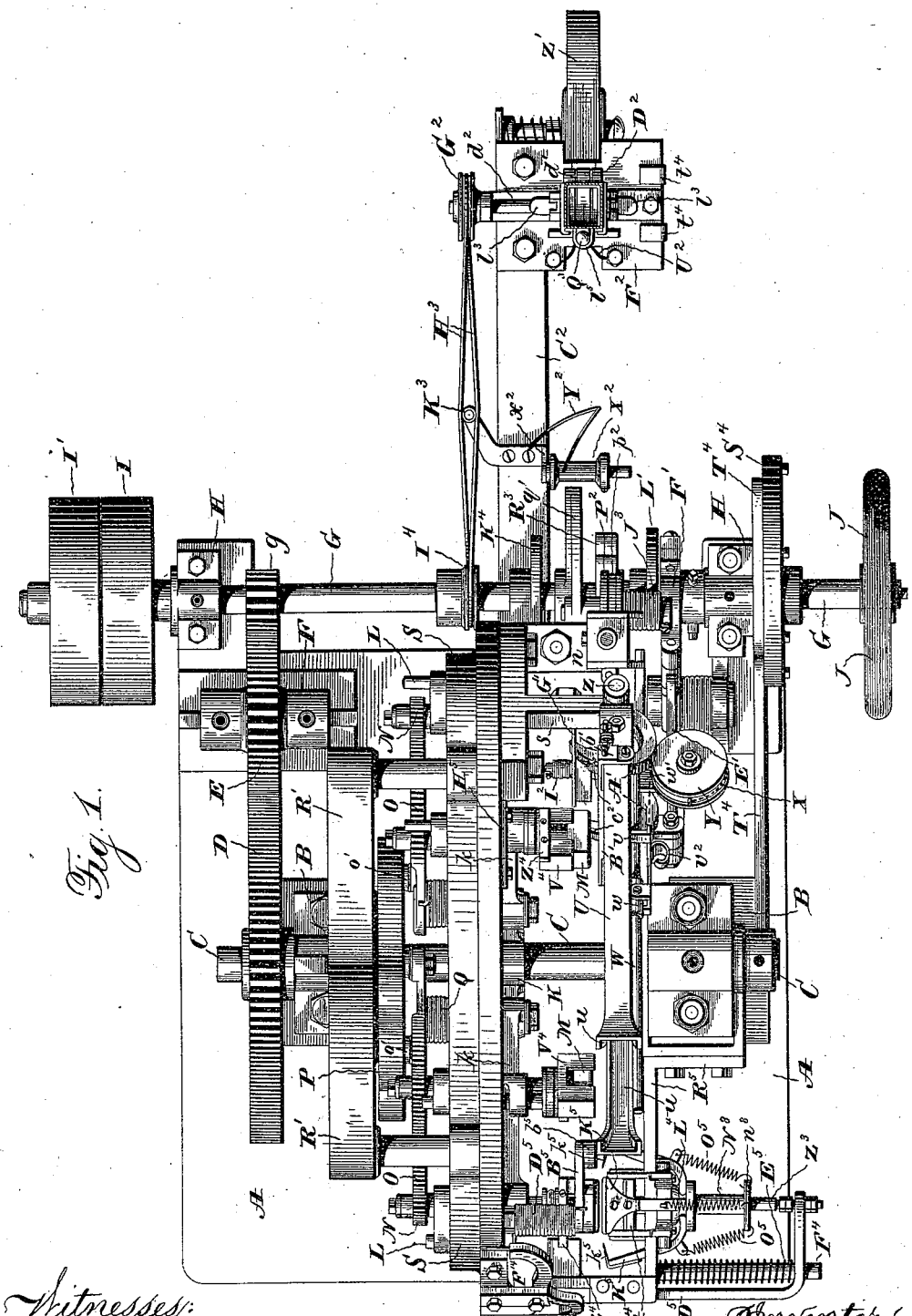
Fig. 1.
Witnesses:
Jas. E. Hutchinson.
Henry C. Hazard.
Inventors.

(No Model.) 16 Sheets—Sheet 4.

C. LOYENS & A. PAULSON.
BOX MAKING MACHINE.

No. 556,997. Patented Mar. 24, 1896.

Fig. 4.

Witnesses.
Jas. E. Hutchinson
Henry C. Hazard

Inventors.
Charles Loyens and Andrew Paulson, by
Prindle and Russell, their Attys (No Model.) 16 Sheets—Sheet 5.

C. LOYENS & A. PAULSON.
BOX MAKING MACHINE.

No. 556,997. Patented Mar. 24, 1896.

Fig. 5.

Witnesses:
Jas. E. Hutchinson.
Henry C. Hazard.

Inventors.
Charles Loyens & Anders Paulson
by Prindle & Russell, their Attys.

(No Model.) 16 Sheets—Sheet 6.

C. LOYENS & A. PAULSON.
BOX MAKING MACHINE.

No. 556,997. Patented Mar. 24, 1896.

Witnesses:
Jas. E. Hutchinson.
Henry C. Hazard.

Inventors.
Charles Loyens & Andrew Paulson, by
Dindle & Russell, their Attys.

(No Model.) 16 Sheets—Sheet 7.

C. LOYENS & A. PAULSON.
BOX MAKING MACHINE.

No. 556,997. Patented Mar. 24, 1896.

Witnesses:
Jas. E. Hutchinson.
Henry C. Hazard.

Inventors:
Charles Loyens & Andrew Paulson, by
Prindle & Russell, their Attys.

(No Model.)  16 Sheets—Sheet 8.

C. LOYENS & A. PAULSON.
BOX MAKING MACHINE.

No. 556,997. Patented Mar. 24, 1896.

Witnesses:
Jas. E. Hutchinson.
Henry C. Hazard.

Inventors.
Charles Loyens and Anders Paulson, by
Crindle and Russell, their Attys.

(No Model.) 16 Sheets—Sheet 10.

C. LOYENS & A. PAULSON.
BOX MAKING MACHINE.

No. 556,997. Patented Mar. 24, 1896.

Witnesses:
Jas E. Hutchinson
Henry C. Hazard

Inventors:
Charles Loyens and Andrew Paulson, by
Prindle and Russell, their attys.

(No Model.) 16 Sheets—Sheet 11.
C. LOYENS & A. PAULSON.
BOX MAKING MACHINE.
No. 556,997. Patented Mar. 24, 1896.
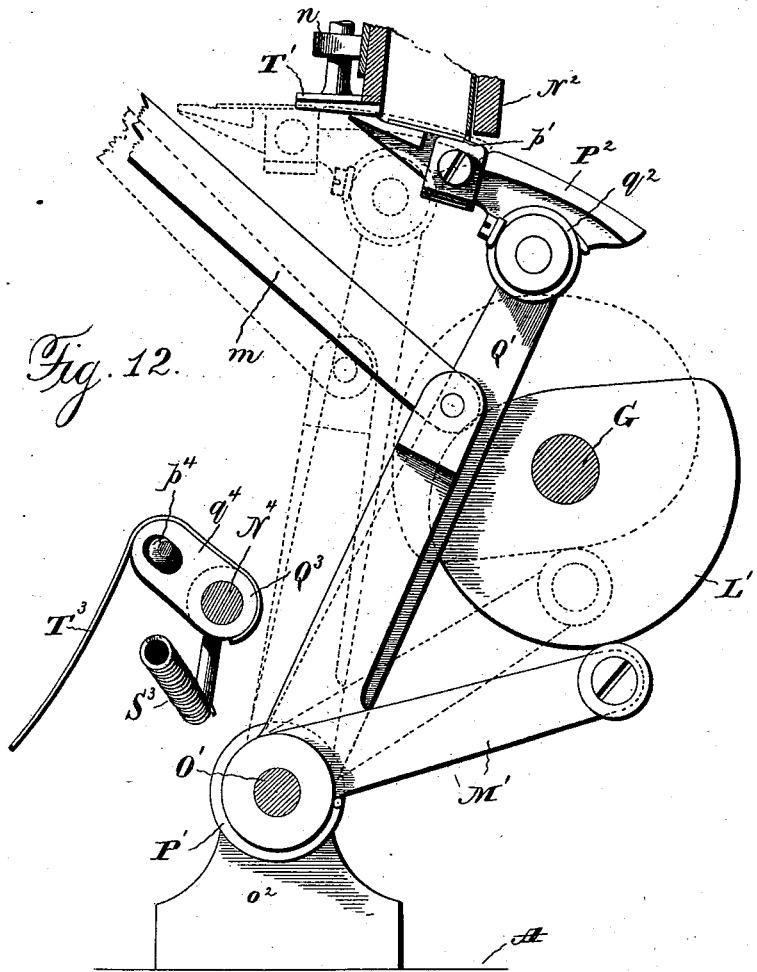
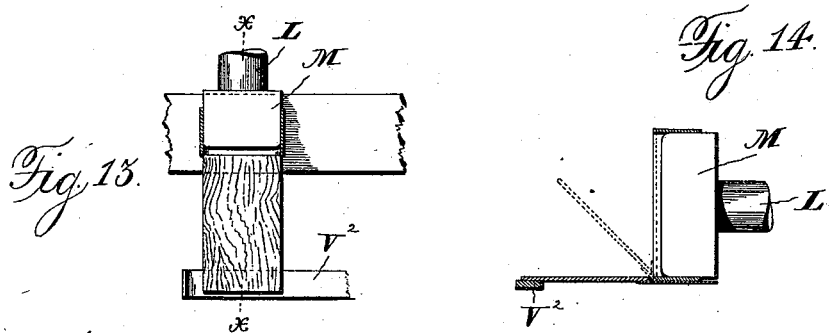

(No Model.) 16 Sheets—Sheet 12.

C. LOYENS & A. PAULSON.
BOX MAKING MACHINE.

No. 556,997. Patented Mar. 24, 1896.

Witnesses:
Jas. E. Hutchinson
Henry C. Hazard

Inventors
Charles Loyens and Andrew Paulson, by Prindle and Russell, their Attys (No Model.) 16 Sheets—Sheet 14.

C. LOYENS & A. PAULSON.
BOX MAKING MACHINE.

No. 556,997. Patented Mar. 24, 1896.

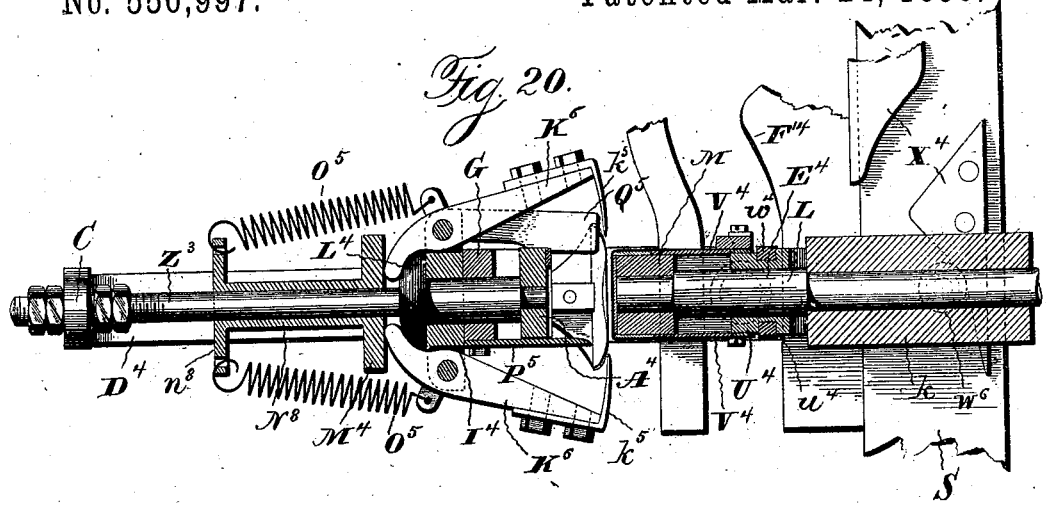
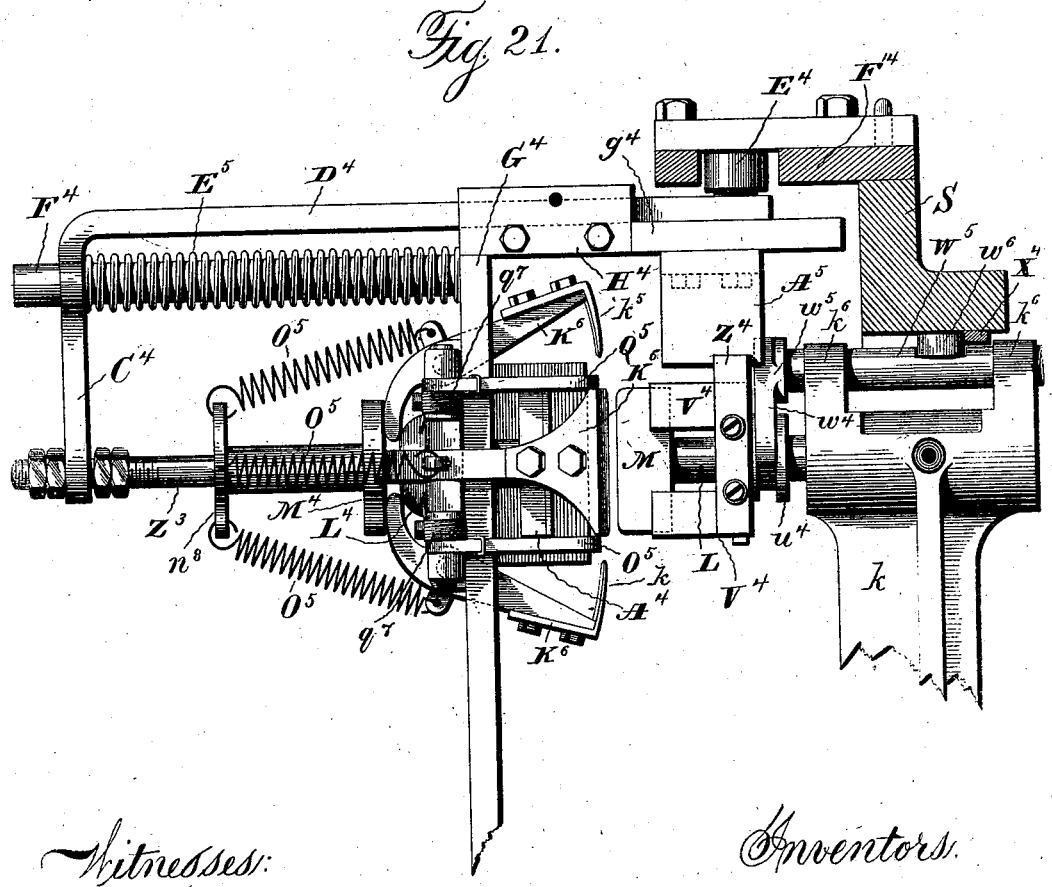

(No Model.) 16 Sheets—Sheet 16.

C. LOYENS & A. PAULSON.
BOX MAKING MACHINE.

No. 556,997. Patented Mar. 24, 1896.

UNITED STATES PATENT OFFICE.

CHARLES LOYENS AND ANDERS PAULSON, OF BREDA, NETHERLANDS, ASSIGNORS TO THE DIAMOND MATCH COMPANY, OF CHICAGO, ILLINOIS.

BOX-MAKING MACHINE.

SPECIFICATION forming part of Letters Patent No. 556,997, dated March 24, 1896.

Application filed August 13, 1895. Serial No. 559,147. (No model.) Patented in Belgium July 31, 1893, No. 105,606; in France August 31, 1893, No. 232,550; in Germany November 11, 1893, No. 79,105; in England January 18, 1894, No. 1,161; in Sweden January 25, 1894, No. 5,753; in Norway February 14, 1894, No. 3,649; in Denmark June 21, 1894, and in Austria June 24, 1894, No. 9,962/24,333.

*To all whom it may concern:*

Be it known that we, CHARLES LOYENS and ANDERS PAULSON, subjects of the Queen of the Netherlands, residing at Breda, in the Province of Brabant, Netherlands, have invented certain new and useful Improvements in Box-Making Machines, (patented in Belgium July 31, 1893, No. 105,606; in France August 31, 1893, No. 232,550; in Germany November 11, 1893, No. 79,105; in England January 18, 1894, No. 1,161; in Sweden January 25, 1894, No. 5,753; in Norway February 14, 1894, No. 3,649; in Denmark June 21, 1894, and in Austria June 24, 1894, No. 9,962/24,333;) and we do hereby declare that the following is a full, clear, and exact description thereof, reference being had to the accompanying drawings, in which—

Figure 3:
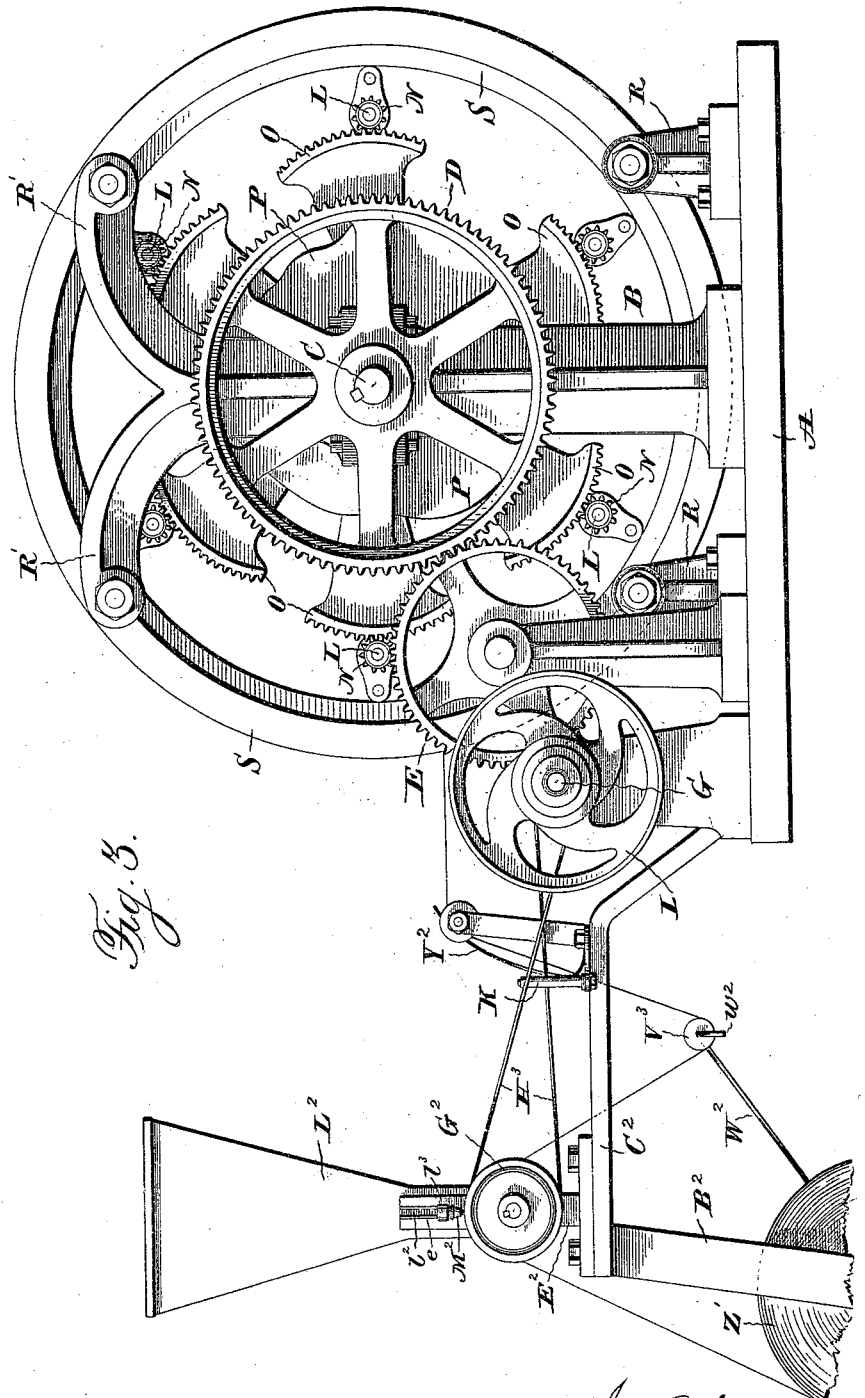
Figure 6:
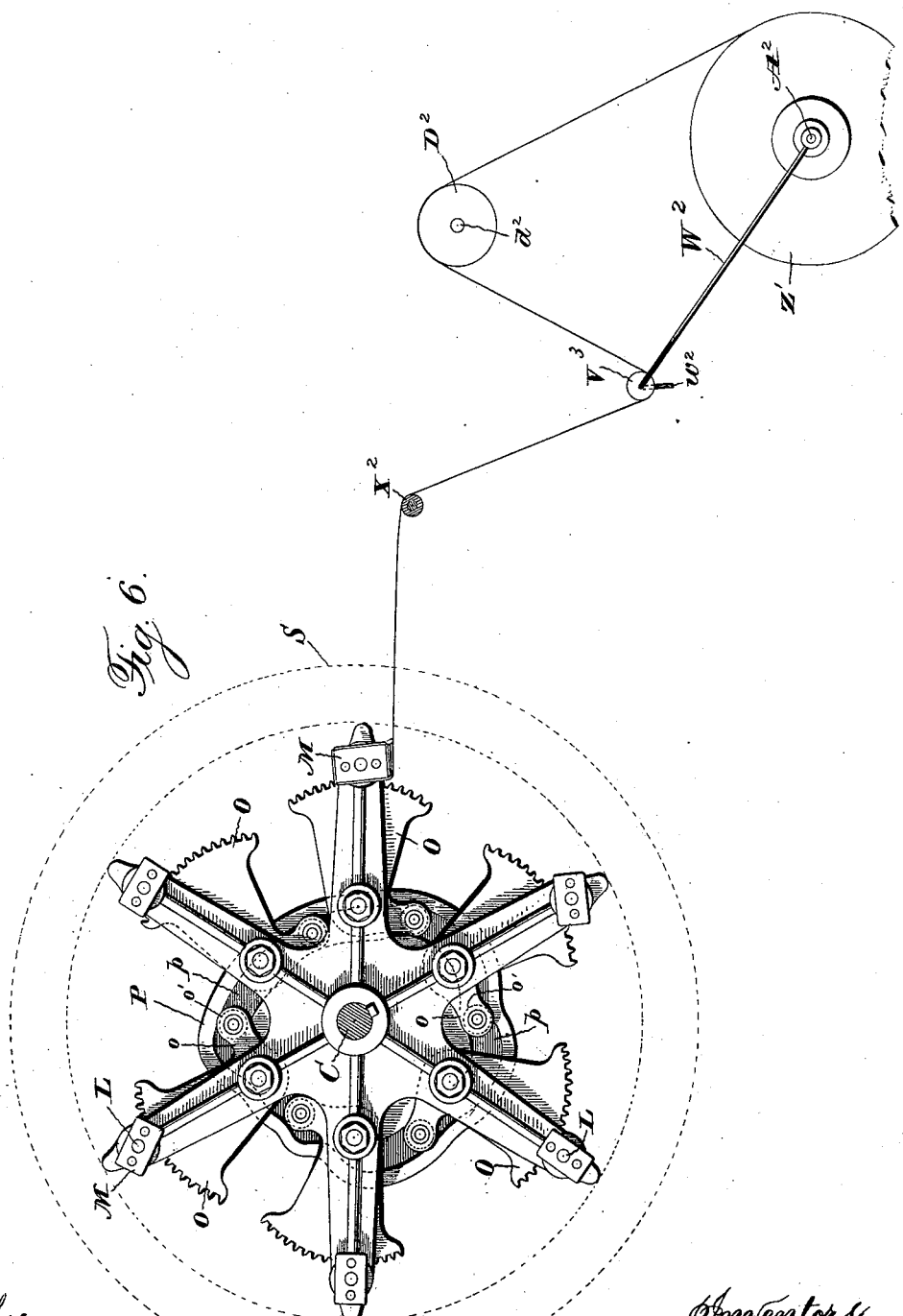
Figure 7:
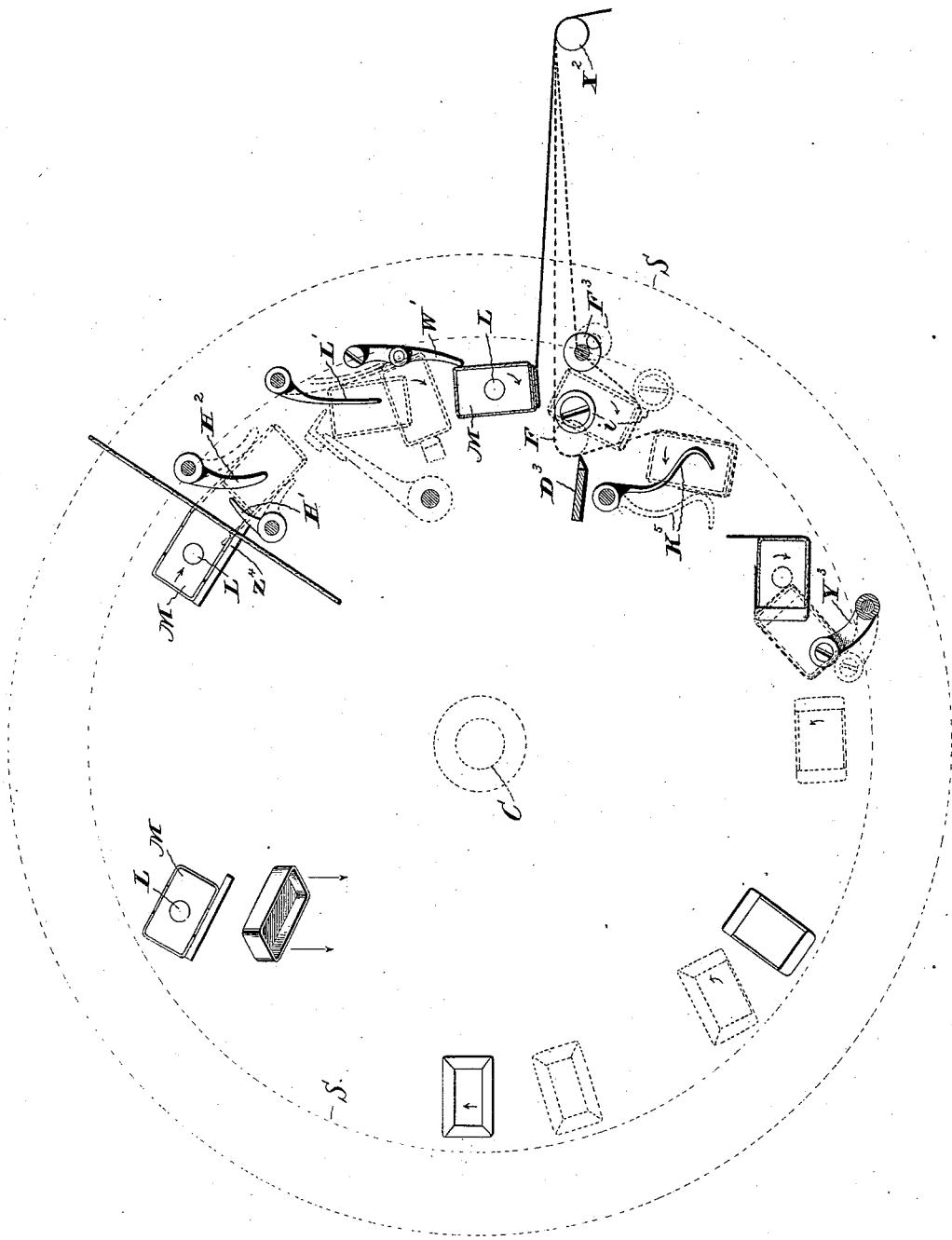
Figure 8:
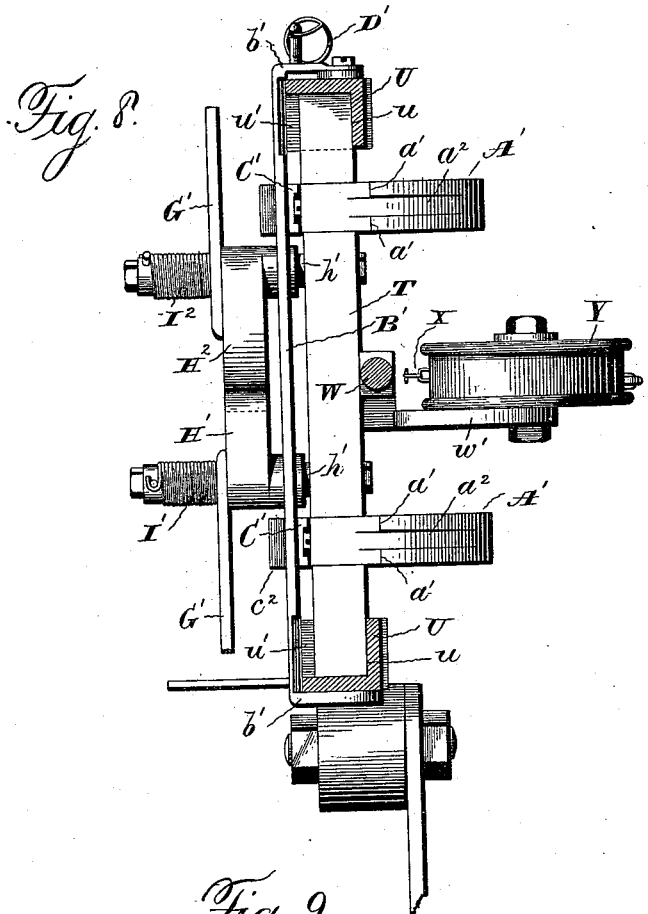
Figure 9:
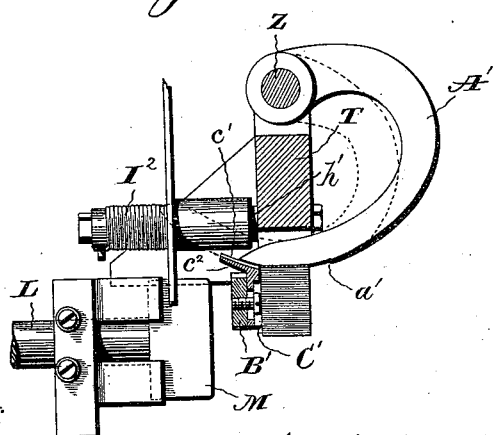
Figure 10:
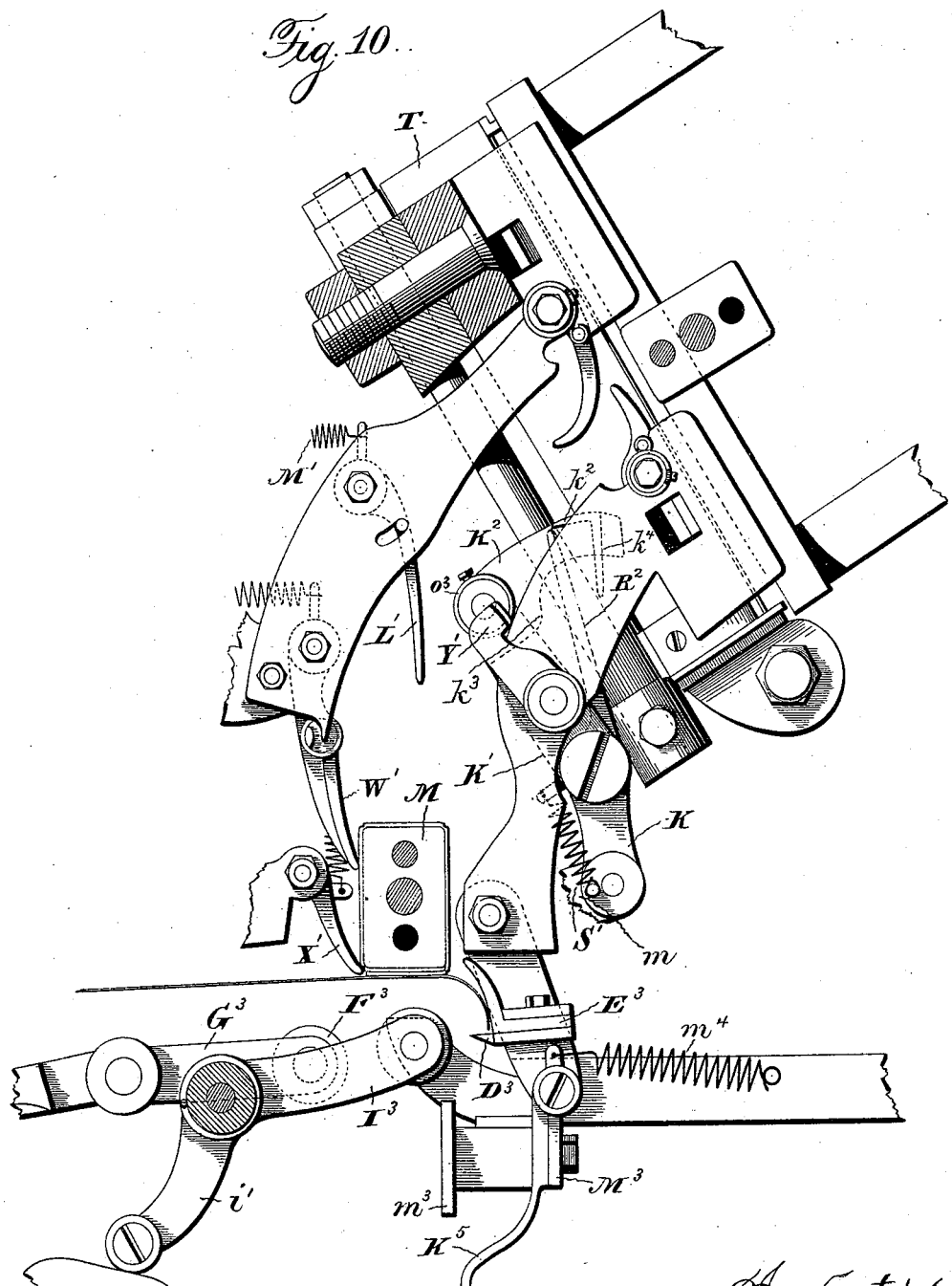
Figure 11:
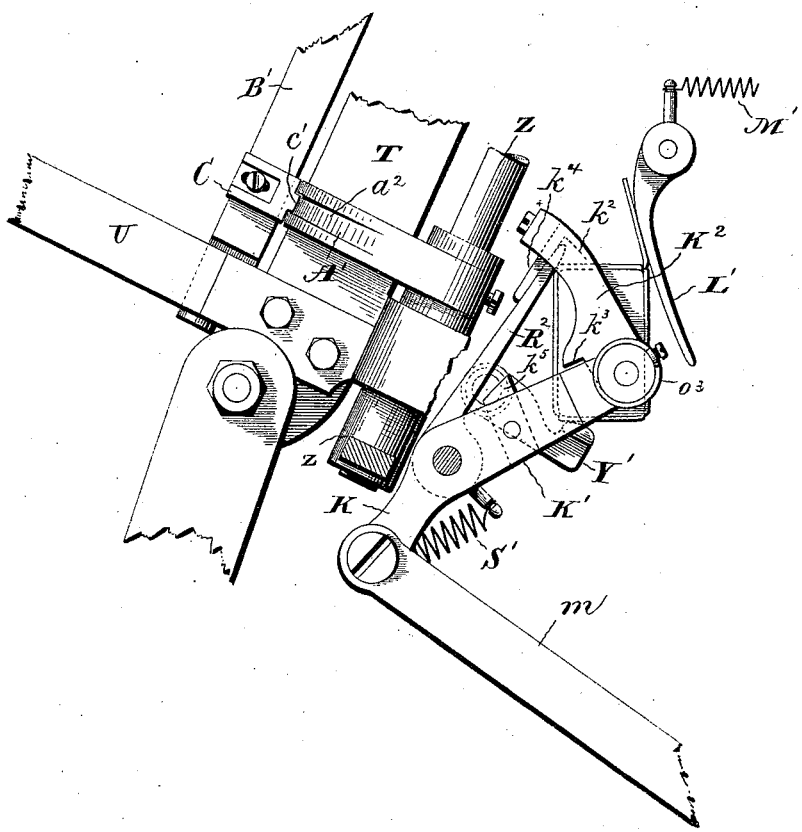
Figure 15:
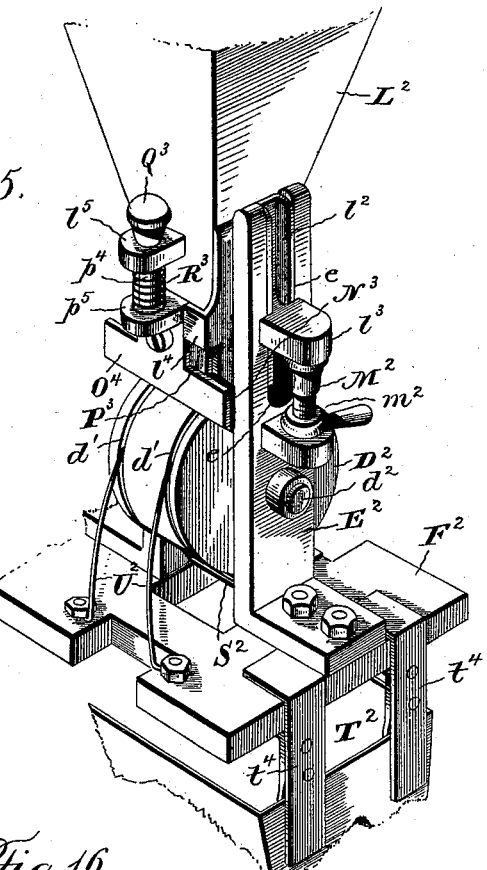
Figure 16:
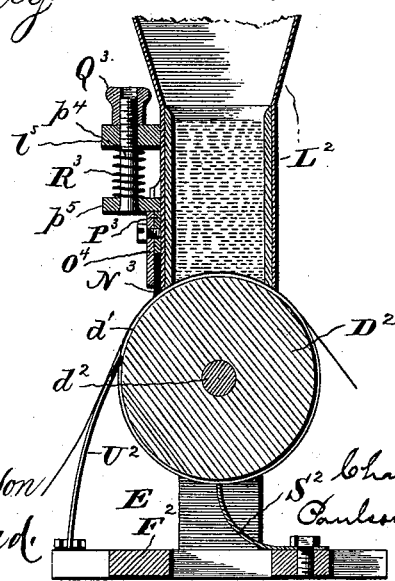
Figure 17:
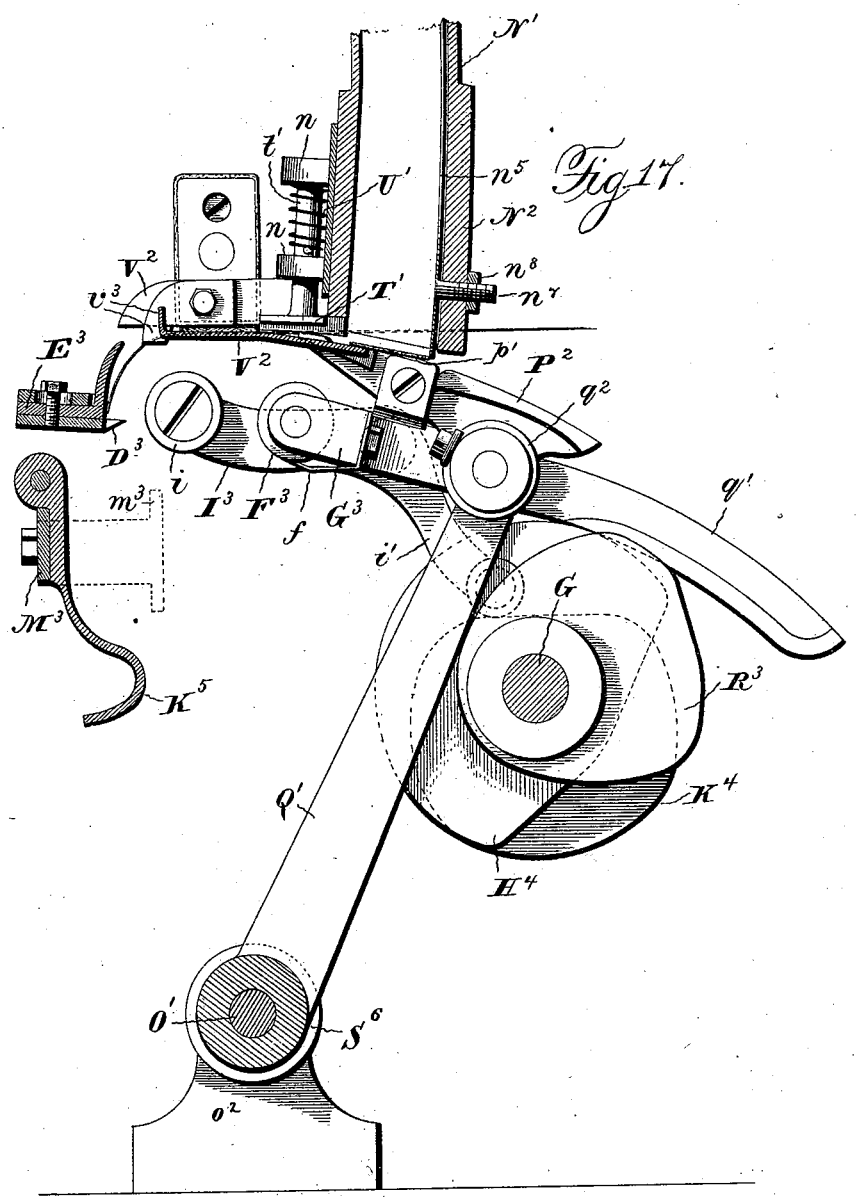
Figure 18:
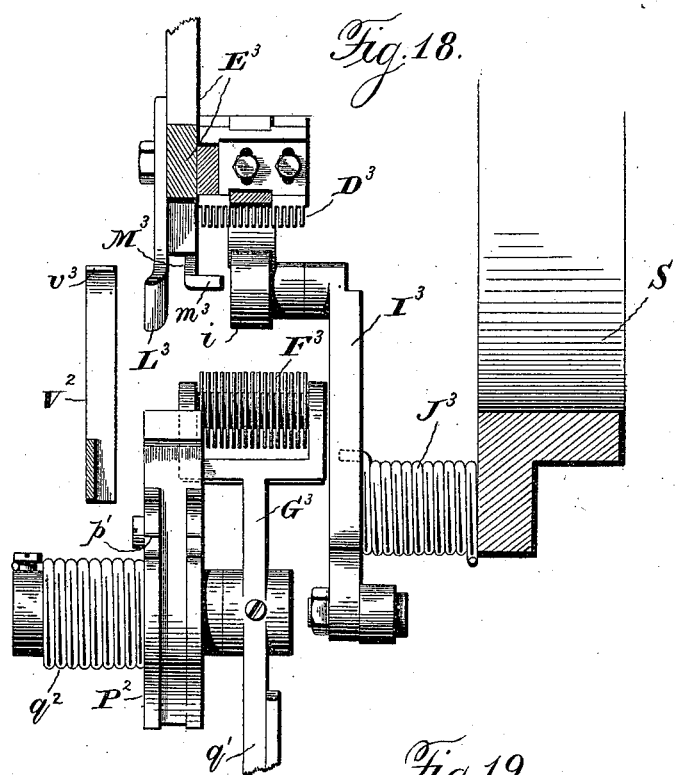
Figure 19:
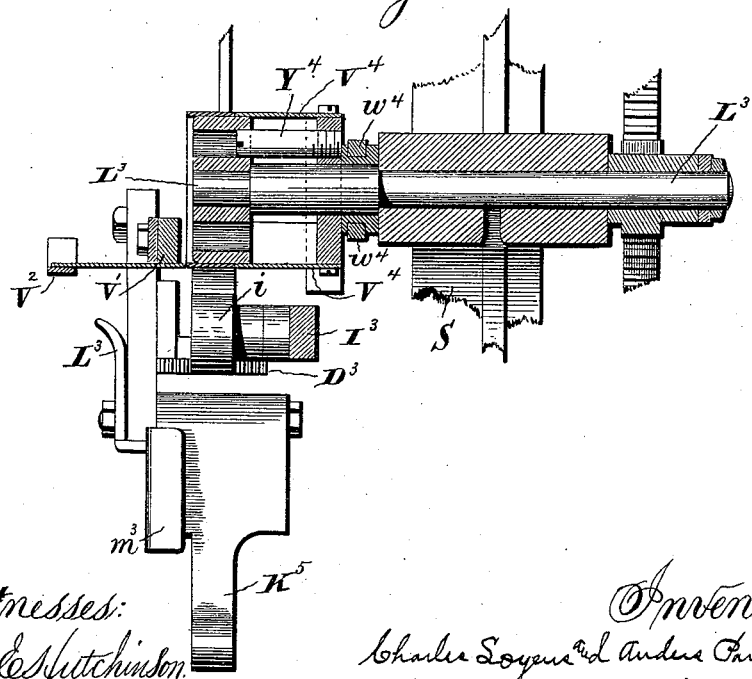
Figure 22:
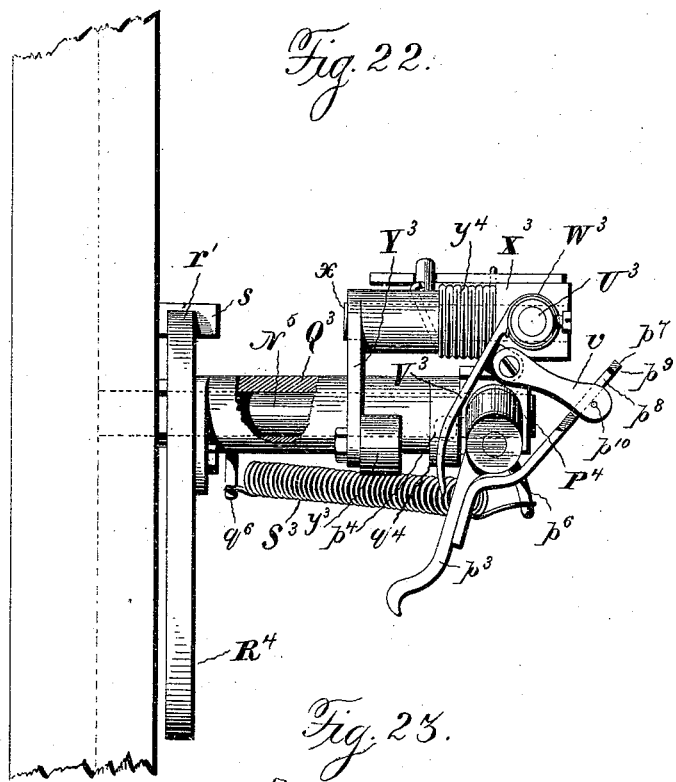
Figure 23:
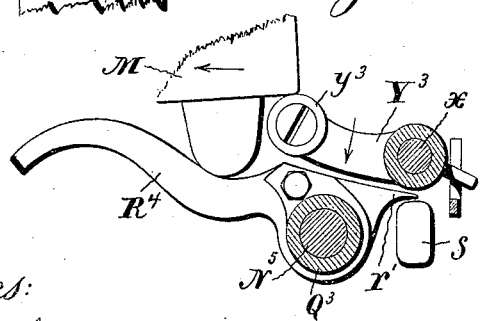

Figure 1 is a plan view of a machine constructed in accordance with our invention. Figs. 2 and 3 are respectively elevations of opposite sides thereof. Figs. 4 and 5 are respectively elevations of opposite ends of said machine. Fig. 6 is a side elevation with parts omitted, showing the mandrel-actuating mechanism. Fig. 7 is a diagrammatic view showing the successive operations employed in the making of a box. Figs. 8 and 9 are detail views of the mechanism for feeding a blank for the sides or frame of the box to the mandrels. Figs. 10 and 11 are detail views from opposite sides of said feeding mechanism and the mechanism for shaping said blank to form such frame. Fig. 12 is a detail view, partly in section and partly in elevation, of the devices for feeding the box-bottoms from their hopper. Fig. 13 is a detail plan view of a portion of such mechanism, showing a box-bottom as having been fed into position for its attachment to the box sides or frame. Fig. 14 is a section on line $x$ $x$ of Fig. 13. Fig. 15 is a detail view in perspective of the mechanism for applying the paste or glue to the paper. Fig. 16 is a detail view of said mechanism in vertical section. Figs. 17, 18, and 19 are detail views of the mechanism for severing the covering-paper from the strip of stock and for first affixing the same to the sides or frame and bottom of the box. Figs. 20 and 21 are detail views of one of the paper folding and pasting devices; and Figs. 22 and 23 are detail views, partly in section and partly in elevation, of the mechanism for folding and pasting the paper to the inner faces of the box sides and ends.

Letters of like name and kind refer to like parts in each of the figures.

The object of our invention is to enable boxes for matches, &c., to be rapidly and cheaply made; and to this end said invention consists in the machine and in the construction and combination of the parts thereof, substantially as and for the purpose hereinafter specified.

The description of box for whose manufacture we have designed our machine is one commonly constructed from a veneer of wood covered and held in shape by paper, and consists of sides and ends and a bottom, the paper being pasted over the outer surfaces of the sides and ends, a portion of the bottom adjacent to the same, and a portion or all of the interior surfaces of the sides and ends. In the manufacture of such a box it is necessary to employ a blank in the form of a strip long enough when bent to form the two sides and two ends of the box, a blank for the bottom, and a strip of paper to cover these two, as above indicated, when the same are placed together in proper relative position.

In the carrying of our invention into practice we employ a suitably-supported base-plate A upon which we mount the parts of our machine. Bolted to said plate are two standards B and B, that at their upper ends have bearings for a horizontal shaft C, which at one end has keyed or otherwise fastened to it a gear-wheel D that meshes with a smaller gear E journaled in bearings upon standards F and F secured to the base-plate A, and which gear E meshes with and receives motion from a pinion $g$ keyed to a shaft G, that is journaled in bearings upon standards H and H, located, respectively, at opposite sides of the base-plate A, to which they are bolted. At one end said shaft is provided with fast and loose band-pulleys I and I' and at its other end with a balance or fly wheel J.

Keyed or otherwise fastened to the shaft C at a point between the two standards B and B is a spider, consisting of a hub K and six radial arms $k$ and $k$, each of which arms at its outer end journals a shaft L, that at one end has attached to it an oblong flat-sided block M and at its other end is provided with a pinion N. Meshing with each pinion N is a segmental rack O, that is pivoted at its inner end to the arm $k$, and at such end has an arm $o$ extending substantially at right angles thereto, which carries a roller $o'$ that engages a cam-groove $p$ in the face of a plate P rigidly attached by bolts or otherwise to the adjacent standard B. A coiled spring Q placed around the pivot of each rack O, with one end engaging the latter and the other the appropriate arm $k$ of the spider, serves to hold the roller $o'$ yieldingly against one face of the cam-groove, and thus avoids undue rattling or jars to the parts in the passage of the rollers through said groove.

The blocks M, which constitute a series of mandrels, besides their revolution with the shaft C, have each an independent rotation on their respective shafts L, caused by the vibration of the racks O by the cam-groove $p$ as the spider is revolved by the shaft, the shape of such groove being such that at certain points in their revolution with the shaft the racks are rocked in one direction upon their pivots, while at other points they are rocked in the reverse direction. The objects of these motions of the mandrels will appear hereinafter.

Bolted to two brackets R and R, that are secured to the base A and to a V-shaped bracket R' bolted to the top of the standard B adjoining the cam-plate P, is an annular or ring-shaped support or frame S, that stands in line with and encircles the mandrel-carrying spider. Secured to a horizontally-projecting lug $s$ suitably attached to said frame S is a bar T standing at an angle of about thirty degrees from the vertical, to which are attached two upwardly-inclined parallel bars U and U, with grooves $u$ and $u$ in their respective inner faces. The distance of the bottoms of the grooves $u$ and $u$ from each other is substantially equal to the length of the blanks which are to form the sides and ends or the frame of the finished box, and said grooves form a chute or hopper whose bottom is the higher side of the bar T, into which a quantity of said blanks can be placed for feeding into the machine to be operated upon. The outer end of each groove $u$ is flared, as shown, to facilitate the placing of blanks therein.

The blanks are fed downward through the chute or hopper by a follower consisting of a bar V, having fingers $v$ and $v$ and $v'$ and $v'$ at each end to respectively engage the outer face of the uppermost blank and the side edges of the same and several of those adjacent thereto. At its longitudinal center said bar V is attached to a collar or sleeve $w$, sliding upon a rod W, attached at its lower end to the bar T and extending parallel with the grooved bars U and U, and its downward-feeding movement is given by connecting it by means of a chain or cord X with a spring-actuated drum Y pivoted to an arm $w'$ projecting horizontally from the portion of said rod W that is attached to the bar T. The bar V is pivotally connected with the sleeve $w$ to enable said bar to be swung to move its fingers $v$ and $v$ out of the way to facilitate the placing of blanks in the grooved bars U and U, and it is also provided with a ring or handle $v^2$ for grasping by the hand to enable it to be conveniently manipulated for this purpose and for placing it in engagement with said blanks.

Journaled in lugs or bosses $t'$ and $t'$ at the upper and lower ends, respectively, of the lower side of the bar T is a shaft Z, which carries two substantially semicircular fingers A' and A' that are adapted to be reciprocated by the rocking of the shaft across the bottom of the blank-hopper and feed therefrom, one at a time, the blanks therein into the path of the mandrels as they revolve with the shaft G. Each finger A' is provided with a shoulder at $a'$ of a height equal to the thickness of a blank, so as to engage therewith and carry the same, and to enable such fingers to engage only the lowermost blank in the hopper the bar T is slotted for the passage of each finger, so that only the shouldered portion thereof projects above the bottom of said hopper. To permit the removal of the blank by the fingers A' and A', the inner side of each grooved bar U and U is provided with an opening or slot $u'$.

The removal of more than one blank at a time from the hopper is prevented by the employment of a plate B' pivoted, by horizontal extensions $b'$ and $b'$, at its upper and lower ends to the upper and lower sides of the bars U and U, and provided, in line with each finger A', with a plate C', having an edge lying close to the path of the shouldered portion of the finger, but not so near as to be touched by the same. Projecting from such edge of each plate C' is a centrally-located rib $c'$, to clear which the shouldered portion of the finger A' is provided with a groove $a^2$. The projection of this rib into the groove $a^2$ makes it absolutely impossible for the blank to escape from the hopper while the fingers are feeding the lowermost one out of the same, for as soon as the latter passes the plate the rib will enter the groove and thus obstruct the outward passage of the then lowermost blank, which otherwise might be caused from the friction thereon of the feeding-arm in its outward movement.

The purpose of pivoting the plate B' is to enable the ribs $c'$ and $c'$ to be moved out of the way of the blank being fed out by the engagement therewith of said blank. Normally, the plate B' is held yieldingly by means of a coiled spring D' in such position that the ribs $c'$ and $c'$ stand in the path of the blank being fed out. Each plate $C'$ has a horizontal extension or foot $c^2$ to form an extended bearing for the blank, and each is adjustably attached to the plate $B'$ by a slot-and-screw connection, as shown.

To rock the finger-carrying shaft Z said shaft is provided at its lower end with a crank-arm $z$ that is connected by a rod or pitman $E'$ with an eccentric $F'$ upon the driving-shaft G.

Two suitably-supported plates $G'$ and $G'$ placed opposite the point of exit from the hopper prevent the blank being thrown too far by the fingers $A'$ and $A'$ in removing the same therefrom and insure that said blank will be in proper position for engagement by one of the mandrels M. Said mandrel is in such position at the time of the feeding out of the blank from the hopper that one of its small ends will strike the central portion of the blank as the shaft C revolves and carry said blank along with it in its movement by said shaft.

Pivoted at $h'$ and $h'$ to the inner side of the bar T are two fingers $H'$ and $H^2$ that normally extend toward each other in the path of the mandrel and blank, being yieldingly held in such position by means of a coiled spring $I'$ acting upon each, and each having a stop to limit its movement by its spring $I'$. As the mandrel is carried onward by the shaft C said fingers move out of the way, but each in so doing engages a projecting portion of the blank and bends the same closely against one of the sides thereof, the shape and position of said fingers being such that each bears or presses against the blank the entire length of the mandrel.

Pivoted to an extension $t^2$ from the lower end of the bar T is a bar $K'$ that at one end carries an arm $K^2$ standing at substantially a right angle to it, which arm $K^2$ at its free end has a horizontal lug or projection $k^2$ that is adapted to engage one of the projecting ends of the blank upon the mandrel M and fold said blank closely upon and against the end of the mandrel. Necessary movement of the bar $K'$ to effect this operation is given by the same from a cam $L'$ upon the driving-shaft G, which cam engages a bell-crank lever $M'$ that is connected by a link or rod $m$ to the bar $K'$, said bell-crank being pivoted upon a shaft $O'$ and held yieldingly against the periphery of the cam by means of a coiled spring $P'$ placed around the shaft $O'$. Said shaft is journaled in brackets $O^2$ and $O^2$ bolted to the upper side of the base-plate A. The arm $K^2$ is pivotally attached to the bar $K'$ to enable such motion of said arm as to cause the lug or projection $k^2$ to remain in contact with the blank on the mandrel, notwithstanding changes in position of the latter during the operation of said lug. A coiled spring $O^3$ normally tends to swing said arm in opposition to the direction in which it is moved for the purpose just indicated, and to limit the movement thereof by the spring such arm $K^2$ is provided with a shoulder or lug $k^3$ that abuts against the bar $K'$.

A finger $R^2$, pivoted upon the same pivot as the bar $K'$ is pivoted, is moved by a spring $S'$ into contact with the side of the blank whose end portion is bent over by the arm $K^2$ at the point where the corner is formed by said bending to prevent bending or bowing of such side as the end portion is acted upon by said arm $K^2$. During the latter portion of the action of the lug $k^2$ the finger $R^2$ is positively held against the blank by means of an extension $k^4$ of said lug $k^2$. The movement of said finger is limited by a lug $k^5$ upon the bar $K'$, which lug also serves to lift the finger for operation upon the next succeeding blank with the bar as the latter is swung into position for operating upon such blank. The projecting end portion of the other side of the blank is bent downward by a pivoted finger $L'$ held yieldingly in the path of the mandrel by a coiled spring $M'$. Up to the point where the finger $L'$ engages the blank upon the mandrel the latter has no movement upon its own axis, but to permit said finger to properly act said mandrel is revolved upon its shaft through one-fourth of a circle. The end last bent upon the mandrel completes the folding of the frame, and the same is then ready for the attachment of the box-bottom.

The box-bottoms are placed in a vertical hopper $N'$, located to one side of the path of revolution of the mandrels M and M, being supported by a bracket $O^3$, secured to the annular frame, to which it is attached by means of a horizontal lug $n'$ near its lower end, to which lug it is bolted. The bottoms are fed one at a time from the lower end of the hopper by a feeding device constructed and operating substantially like that hereinbefore described for feeding the frame-blanks from the hopper. Said feeding device comprises a curved arm or bar $P^2$, upon whose upper side the blanks in the hopper rest, and which is carried upon the upper end of an arm $Q'$ upon the shaft $O'$, and which arm $Q'$ is vibrated to reciprocate the feeding bar or arm $P^2$ by means of a cam $R^3$ upon the driving-shaft G, which bears directly against said arm $Q'$, and a coiled spring $s^6$, having one end engaging the latter and its other end the shaft-bearing bracket $o'$.

Like each finger $A'$ the bar $P^2$ has a shoulder $p'$ to engage the edge of the lowermost box-bottom, and has a groove $p^2$ in its shouldered or raised portion with which a ribbed plate $T'$ at the exit side of the hopper co-operates precisely as do the ribbed plates $C'$ and $C'$. Said plate $T'$ is attached to the lower end of a vertical rod $t'$ that is passed through two lugs $n$ and $n$, which project from the hopper side, and is held yieldingly against the upper face of the bar $P^2$ by means of a coiled spring $U'$ encircling said rod and bearing against a pin or lug thereon and the upper one of the lugs $n$. As the bottom-receiving surface of the bar $P^2$ inclines slightly from a horizontal plane, the lower portion $N^2$ of the hopper $N'$ is curved sufficiently to cause the bottom to be presented to such surface in a position parallel therewith, so as to insure the engagement of the edge thereof by the shoulder $p'$ of the bar $P^2$.

To feed the bottoms down through the hopper, a follower $n^2$ is employed that rests upon the top of the same. Said follower is attached to the lower end of a vertical rod $n^3$ which extends through a plate at the top of the hopper and at its upper end carries a weight $n^4$. Preferably the lower face of the follower is inclined, so as to be substantially parallel with the surface of the bar $P^2$, to which the bottoms are delivered to insure their proper delivery thereto.

At the lower end of the outer wall of the hopper and within the latter so as to bear against the edges of the box-bottoms a spring-plate $n^5$ is provided that is secured to the hopper-wall by a tongue $n^6$ at its upper end, which is bent to pass outward through an opening therein to enable it to be bolted to the outer side of said wall to avoid obstruction on the inside. The pressure of the spring may be varied by an adjusting device at its lower end, consisting of a threaded pin $n^7$ and a nut $n^8$. Said spring operates to check the too free passage of the bottoms from the hopper and relieves the pressure thereof upon the bar $P'$.

The position of the hopper $N'$ is such, relative to the mandrel M, that the inner end edge of the bottom is in the same vertical plane as the outer face of said mandrel, and said bottom when fed from the hopper stands at right angles to its position when attached to the frame. The width of the bar $P^2$ is less than the length of the bottom, and the same at the exit side of the hopper moves between two horizontal extensions $V'$ and $V^2$ thereof, the former being on the side adjacent to the mandrels and the latter upon the other or outer side thereof. The under side of the extension $V'$ is in such a horizontal plane that the adjacent projecting end of the box-bottom passes beneath the same, while the upper side of the extension $V^2$ is in such horizontal plane that the adjacent projecting end of the bottom passes over and rests upon the same. Each of said extensions has a vertical lug $v^3$ forming stops to the movement of the box-bottom by engaging its forward side edge to insure its proper position relative to the frame.

During the feeding of the bottom from the hopper the mandrel, with the folded blank or frame upon it, is carried by the revolution of the shaft C from the point where the finger $L'$ completes such folding to the point where such bottom is fed out, and while being so moved by the shaft said mandrel is revolved upon its own shaft one-fourth of a revolution, so as to bring the end of the frame formed by the two overlapped portions lowermost and in line with the fed-out bottom. The frame is held to the mandrel during this movement by spring-actuated fingers $W'$ and $X'$, that engage the same successively upon the same side, and by a spring-actuated finger $Y'$, located opposite the other two and engaging the end portion of the frame. Said finger $Y'$ is placed in contact with the frame-blank immediately after the sides thereof have been turned upon the mandrel by the fingers $H'$ and $H^2$, and thus holds the partially-made frame from moving off the mandrel, and it does not pass out of engagement therewith until the finger $X'$ engages the frame.

With the frame and bottom in the relative position above described, the paper for uniting and covering the same is attached thereto, the same being supplied from a roll $Z'$ upon a spindle $A^2$ that projects horizontally from an arm $B^2$ depending from the end of a horizontal bar $C^2$ that is bolted to the under side of the base A. From said roll the paper is passed to and over a drum $D^2$ upon a horizontal shaft $d^2$, that is journaled in bearings between two vertical bars $E^2$ and $E^2$ upon opposite sides of the drum, and which are bolted to a horizontal plate $F^2$, attached to the upper side of the bar $C^2$ at its end. To rotate said drum its shaft carries at one end a grooved pulley $G^2$, which is connected by a twisted cord or band $H^3$ with a similar pulley $I^4$ upon the driving-shaft G. Preferably, where the portions of the cord $H^3$ pass each other, a roller $K^3$, supported from the bar $C^2$, is interposed between them to avoid the friction and wear that would result from their contact.

Directly over the drum $D^2$ is a hopper-shaped glue or paste receptacle $L^2$, which supplies paste or glue to the upper side of the paper as it passes over said drum. Said receptacle upon opposite sides has two vertical ribs $l^2$ and $l^2$, that respectively engage vertical slots $e$ and $e$ in the upper portion of the two bars $E^2$ and $E^2$, and projecting horizontally from each of said ribs is a lug $l^3$, that rests upon the upper end of a vertical screw $M^2$ tapped through a horizontal lug upon the side of each bar $E^2$. By means of said screws $M^2$ and $M^2$ the receptacle $L^2$ can be adjusted vertically toward and from the drum $D^2$, so as to provide just sufficient space for the passage of the paper. Each screw $M^2$ is provided with a lock-nut $m^2$ to hold it at the desired adjustment.

To prevent an excess of glue being applied to the paper, an elastic or yielding strip $N^3$, of rubber, preferably, is arranged upon the side of the receptacle at which the paper emerges, whose lower edge is placed with the required closeness to the upper surface of the paper to attain the object named. Said strip $N^3$ is attached to the inner side of a metal plate $O^4$, which is secured to a second plate, $P^3$, whose opposite edges are overlapped by ears or lugs $l^4$ and $l^4$ upon the receptacle $L^2$ and which is vertically adjustable by means of a vertical rod or stem $p^4$, secured at its lower end to a lug $p^5$ upon said plate $P^3$, that passes through a perforated lug $l^5$ upon the hopper side and has its upper end threaded to receive an adjusting-nut $Q^3$. A coiled spring $R^3$, interposed between the two lugs $p^5$ and $l^5$, holds the plates $O^4$ and $P^3$ yieldingly downward.

A scraper or cleaner $S^2$ bears against the under side of the drum $D^2$ to remove any paste or glue therefrom, and drippings or such matter as may be removed by said scraper fall into a drip tank or pan $T^2$ held beneath the roller by two arms $t^4$ and $t^4$, detachably connected to the edge of the plate.

Should the paper adhere to the drum, two light fingers $U^2$ and $U^2$, attached to and rising from the plate $F^2$ and resting at their upper ends upon the drum periphery, will engage therewith and strip the same from the drum. The free ends of said fingers rest in grooves $d'$ and $d'$ in the drum, so as to avoid any possibility of the paper being caught and torn thereby.

From the drum $D^2$ the paper passes downward to and around a tension-roller $V^3$, that is carried at the end of a wire or rod $W^2$, pivoted to and supported by the spindle of the paper-roll and which wire or rod has an extension $w^2$ from the roller-journaling portion that serves to confine the paper thereon at one side, the wire or rod itself performing the like function at the opposite side. From said roller $V^3$ the paper passes upward to and over a flanged guide $X^2$, supported by an arm or bracket $x^2$ rising from the bar $C^2$, against which guide the paper is lightly pressed by a spring-wire finger $Y^2$ attached to said bracket at its lower end. The weight of the roller $V^3$ is sufficient to preserve the bight or loop in the paper between the drum $D^2$ and the guide $X^2$.

From the guide $X^2$ the paper passes horizontally beneath the box-bottom hopper $N'$ alongside the feeding-bar $P^2$, with a portion extending beneath the fed-out bottom and a portion beneath and to one side of the box-frame upon the mandrel.

The quantity of paper for each box is severed from the strip by a fixed serrated knife $D^3$, attached to a bar $E^3$, that is secured to the adjacent standard $B$, and a grooved roller $F^3$, carried by a bar $G^3$, attached to and moving with the arm $P^2$ of the box-bottom feeding device toward and from the knife $D^3$. The grooves of the roller $F^3$ co-operate with the teeth of the knife to cut the paper when said roller is swung over against said knife. Any fragments of paper left in the grooves of the roller are removed by a comb $f$, whose teeth enter the same. Said roller-carrying bar is pivotally connected with the arm $Q'$ and has a tailpiece $q'$, that is held by a coiled spring $q^2$ yieldingly in contact with a cam $H^4$ upon the driving-shaft $G$, said cam being of such shape that as soon as the paper has been cut by the knife and roller and the latter begins to recede from the knife said roller-bar will be rocked to raise the roller into contact with the free end of the paper and paste the same to the box-bottom, the hopper extension $V'$ serving as a support during such operation. Immediately following the action of the roller $F^3$, so as to be substantially simultaneous therewith, the portion of paper beneath the box-frame end is caught and moved into contact with said end and thus pasted thereto by a roller $i$, carried at the end of a lever $I^3$, pivoted to the annular frame $S$, said roller being so moved by a coiled spring $J^3$, that is permitted to act at the proper time by a cam $K^4$ upon the driving-shaft $G$, which cam controls the movement of the lever $I^3$ by co-operating with an extension $i'$ thereof. The frame, bottom, and paper being now united, in the further revolution of the mandrel with the shaft $C$ said parts of the box are moved along together. In moving onward from the point where the pasting of the paper to the bottom and frame takes place the bottom is partially turned to take its proper position relative to the frame by the hopper extension $V^2$, and a further movement toward such position is caused by its striking the extremity of an arm $L^3$, attached to the knife-supporting bar $E^3$ and placed nearer the path of the mandrel than the part $V^2$.

The complete placing of the bottom in its position relative to the frame and against the end of the mandrel is effected by said bottom being moved into contact with the inwardly-turned end $m^3$ of a plate $M^3$, attached to the bar $E^3$. While the mandrel is being moved by the shaft $C$ to cause the placing of the bottom in position, as just described, the roller $i$ of lever $I^3$ is pasting the paper against one end and the outer side of the frame. A short flap of the paper at the free end thereof is next pasted to the opposite side by a finger $K^5$, attached to the plate $M^3$, and as it is required that such finger should move to effect the proper pasting the plate $M^3$ is pivoted to the bar $E^2$, and while said finger is at work the end $m^3$ of the plate $M^3$ continues in contact with the box-bottom and holds it in place, a coiled spring $m^4$ acting to restore the plate to the position from which it is moved during the pasting operation.

At substantially equal distance apart there are attached to, so as to project horizontally from, the lower portion of the annular frame $S$ four round rods or bars $N^4$, $N^5$, $N^6$ and $N^7$, to the outer end of each of which is rigidly attached a collar $O^4$, having a spindle $o^4$, that projects radially inward, and upon which is pivoted a sleeve $P^4$, carrying at its inner end an arm $p^3$, whose outer end is widened and rounded on its side toward the mandrels. Journaled upon each rod or bar $N^4$, $N^5$, $N^6$, and $N^7$ is a sleeve $Q^3$, that at its outer end has a radial lug $q^4$, that engages the rounded ball-shaped end of an arm $p^4$ at the lower end of the sleeve $P^4$, and consitutes means whereby rocking of the latter may be caused by rotating the sleeve $Q^3$. The rotation of the latter is a partial one in opposite directions, and is caused by means of cam-arm $R^4$ attached at the inner end of said sleeve, so as to be in the path of movement of the outer ends of the spider-arms $k$ and $k$, and a spring $S^3$ attached at one end to a radial arm $q^6$ upon said sleeve $Q^3$, and at its other end to a like arm $p^6$ upon the sleeve $P^4$, said spring operating to move the latter sleeve in opposition to the cam-arm. The spring yieldingly holds the arm $p^3$ in the path of the mandrel, while the cam-arm $R^4$, when moved by the spider-arms $k$ and $k$, swings said arm $p^3$ away therefrom. A lug or projection $r'$ on the cam-arm $R^4$ engages a pin or stud $s$ projecting from the annular frame S, and serves to limit the movement of the sleeve by the spring.

To guide the loose end of the paper over the sleeve $P^4$ upon the first rod $N^4$, and to prevent the same becoming caught by the mechanism, a curved plate or apron $T^3$ is attached to said sleeve that extends about halfway to the sleeve of the next rod $N^5$.

Rising vertically from the base A, near the outer end of said rod $N^5$, is a standard $U^3$, upon which is pivoted a horizontal curved finger $V^3$, lying in the same horizontal plane as the adjacent arm $p^7$ and being connected thereto by a link $v$ pivoted to said finger $V^3$ at one end and passing at its other end through a slot $p^8$ in an arm or extension $p^9$ of the arm $p^3$, a pin $p^{10}$ passed through the projecting end of said link preventing the withdrawal thereof from the slot $p$. A coiled spring $W^3$ is provided to move said finger toward the mandrel, while the arm $p^3$ moves it away therefrom. Also attached to the standard $U^3$, below the finger $V^3$, is a block $X^3$, having a horizontal spindle $x$, upon which is pivoted a lever $Y^3$, carrying a roller $y^3$, held yieldingly in the path of the mandrels by a coiled spring $y^4$.

The arms $p^3$ operate successively upon the paper to paste the end and the side portions upon the bottom of the box, the first two operating upon the end portions and the last two upon the side portions, and the finger $V^3$ engages the bottom and presses the same against the mandrel to insure its proper position before the affixing to the second end portion of the bottom of the appropriate flap of paper by the second arm $p^3$. The roller $y^3$ of the lever $Y^3$ engages in succession one end and one side of the paper upon the box-frame to complete the pasting of the paper thereon.

For turning the paper into the box and pasting it against the inner sides thereof the following-described mechanism is employed: Located at a point diametrically opposite the box-bottom hopper $N'$ is a horizontal reciprocable spindle or rod $Z^3$, that at its inner end carries a block $A^4$, corresponding in size and shape to a mandrel M. At its outer end it is connected rigidly to the inturned end $C^4$ of a bar $D^4$, extending parallel therewith, and carrying at its inner end a roller $E^4$, that engages a cam-bar $F^{14}$, suitably attached to the annular frame S, which cam-bar is adapted to impart a longitudinal movement in one direction to said bar $D^4$. The latter is moved in the opposite direction by a coiled spring $E^5$, encircling a rod $F^4$, that projects from a bar $G^4$ and passes through an opening in the end $C^4$ of said bar $D^4$, such spring being interposed between said end and the bar $G^4$. Such bar $G^4$ also supports the spindle $Z^3$ and supports and guides the bar $D^4$, for this latter purpose having a horizontal right-angled extension $g^4$ at its end, to which is attached a plate $H^4$, having flanges at its upper and lower edges which engage the upper and lower edges of said bar, the side thereof being engaged by the plate $H^4$ and the extension $g^4$. Bolted to the outer side of the bar $G^4$ is a plate $I^4$, having at its center an opening for the passage of the spindle $Z^3$, and to each of the four edges of which is pivoted an arm $K^6$, carrying at its inner end a thin plate or blade $k^5$, standing substantially at a right angle to the bar. At its outer end each bar is curved inward toward the spindle $Z^3$ and is engaged upon one side by a collar $L^4$ upon said spindle and upon the other side by a collar $M^4$, at the inner end of a sleeve $N^8$, upon said spindle. The sleeve-collar $M^4$ is held yieldingly against the lever ends, and the latter are held against the spindle-collar $L^4$ by a coiled spring $O^5$ for each bar, that is connected at one end therewith and at the other end to a flange $n^8$ upon the outer end of the sleeve $N^8$. Directly beneath the block $A^4$ and attached to the lower edge of the bar $G^4$ is an inwardly-extending horizontal plate $P^5$, and pivoted to the upper edge of the plate $I^4$, upon opposite sides of the arm $K^5$, are two inwardly-extending fingers $Q^5$ and $Q^5$, that are pressed yieldingly by springs $q^7$ and $q^7$ upon the upper side of the block $A^4$, near the ends thereof. When a mandrel with the partially-made box thereon comes in line with the block, such box is pushed off the same by mechanism to be described onto the plate $P^5$ and against said block, which retreats before the box, the spindle $Z^3$ being moved longitudinally by means of the cam $F^{14}$ and the sliding bar $D^4$. By such movement of the spindle its collar $L^4$, bearing against the inturned ends of the arms $K^5$, will swing the blade-carrying ends inward, and the blades striking the four projecting portions or flaps of the paper will turn the same inward across the open side of the box. The movement of the spindle will now be reversed and the block $A^4$ will push the box back upon the mandrel, and in so doing the latter will force the inturned flaps of paper into and paste them against the inner surfaces of the sides and ends thereof. During such described movement of the box from and back to the mandrel it is held in place and guided by the two fingers $Q^5$ and $Q^5$, which rest lightly thereon, from beneath which the block $A^4$ has been withdrawn.

As the revolution of the shaft C continues while the folding and pasting mechanism just above described is operating, such mechanism is moved in a circular path corresponding to that of the mandrel, and for this purpose the bar G⁴ is rigidly attached to and moves with a swinging frame R⁵, that is pivoted upon the shaft C upon opposite sides of the adjacent standard B and is moved at the proper time by a cam S⁴ mounted upon the driving-shaft G, which reciprocates a rod or bar T⁴ that is connected to a crank-arm $r^5$ on said frame R⁵.

To slide the box off the mandrel there is mounted upon the mandrel-shaft L at the rear side of the mandrel a sliding plate U⁴, to which at each end is attached a plate V⁴ that closely fits over the end portion of the mandrel. At its rear side said plate U⁴ has a grooved collar $u^4$, with which engages the forked end $w^4$ of an arm $w^5$ that is attached to a sliding rod W⁵ mounted parallel with the mandrel-shaft L in ears or lugs $k^6$ and $k^6$ at the outer end of the spider-arm k. At or near its longitudinal center said rod W⁴ carries a roller $w^6$, that is adapted to engage in succession two cam-plates X⁴ and X⁴, attached to the inner periphery of the annular frame S, and thereby be reciprocated to correspondingly move the plates V⁴ V⁴ first to push the box off the mandrel and then to be retracted to leave the mandrel free to again receive the box.

A rod Y⁴, projecting from the plate U⁴, engages an opening through the mandrel and operates to prevent any rocking of said plate upon the mandrel-shaft and consequent binding of the ejector-plates V⁴ and V⁴ upon the mandrel, and to hold the mandrel against possible rotation while the operations necessary to fold inward and paste the paper to the interior of the box are being performed a guide Z⁴ is attached to the plates V⁴ and V⁴ with an end projecting far enough to engage a lug or plate A⁵ attached to the extension $g^4$ of the bar G⁴.

In the path of the mandrel, after leaving the mechanism just above described, there is a roller $b^5$ that is pivoted upon a horizontal rod C⁵, attached to the annular frame S, and which is provided with a coiled spring D⁵ to hold the roller yieldingly in contact with the box upon the mandrel to apply a finishing pressure to the same. An arm E⁶, attached to the rod C⁵, is adapted to be engaged by a pin or stud $b^6$ upon the lever B⁵ to limit the movement of the latter by the spring D⁵.

A cam-plate F⁵, attached to the inner periphery of the annular frame S, is provided to engage the roller $w^6$ of the rod W⁴ to slide the ejector-plates V⁴ and V⁴ to push the completed box off the mandrel into a chute G⁵ for removal from the machine.

A cam-plate H⁵, attached to the inner periphery of the annular frame S, moves the ejector-plates in the opposite direction given by the cam-plate F⁵, and thus prepares the mandrel for work upon another box.

The operation of our machine is as follows:

The necessary strips or pieces of veneer to form the blank for the side and ends or frame of the box, suitably scored or partially severed at four points to permit them to readily bend, and also pieces for the box-bottoms and a roll of paper being supplied at their proper places to the machine, power is applied to the driving-shaft G. By means of the eccentric F' on said shaft the blank-feeding fingers A' and A' are operated to feed a strip for forming the box-frame into the path of one of the mandrels M as the same is moved with the shaft C. Said mandrel is in such position that an end thereof engages the strip at its midlength, and as the revolution of the shaft continues the strip is carried along with the mandrel, and being engaged upon opposite sides of the mandrel by the two fingers H' and H² has the portions projecting beyond the same turned inward against the mandrel sides, and such projecting portions of the strip are of such length that the end of each, equal to the width of the box, is left extending beyond the end of the mandrel. Said ends are next bent in succession, one over and upon the mandrel end and the other upon its companion end, by the respective fingers K² and L'. The continued revolution of the shaft C now brings the mandrel with the folded frame thereon at the point where the box-bottom and the covering and uniting paper are to be attached thereto, and as said parts are to be attached to the end of the frame formed by the overlapping ends the mandrel is rotated a half-revolution by the cam-actuated segment O and pinion N to place said overlapping ends in the required position. By the time this has been effected the box-bottom is fed from the hopper N' in a horizontal position and alongside of and in line with the frame end formed of the overlapping pieces of the strip. Simultaneously with the coming into position of the frame and bottom, the free end of the paper is carried by the paper-severing roller into contact with and pasted against the under side of the bottom and the frame end, and thus unites these three parts. It is to be understood that the width of the paper and its position is such that it projects upon opposite sides of the frame. The mandrel, being carried onward by the rotation of the shaft C, encounters the roller i of the lever or arm I³, and said roller is caused to pass over an end and side of the box and effect the thorough pasting thereon of the paper, and at the same time the box-bottom by the parts L³ and $m^3$ is moved to its proper position relative to the frame, swinging upon its paper connection at one end to said frame. The paper is now attached to one end and one side of the box and to one end portion of the bottom. The remaining side of the box is next acted upon by the finger K⁵, which pastes thereon the free end of the paper, which is of sufficient length, however, only to extend partially over such side, and the mandrel then reaches a point where the first arm $p^3$ of the series of four is moved into contact with the paper upon the said end portion of the bottom, so as to insure the thorough attachment of the same thereat. Up to this point the paper for the box has not been severed from the roll; but enough having now been drawn off the same by the described movement of the mandrel, the cutting is done by the severing mechanism, as hereinbefore described.

In the movement of the mandrel from the point where the bottom and paper are attached to the frame to the point where the first arm $p^3$ operates, the mandrel is rocked slightly by the cam-operated segment O to present the box to the intermediate devices. The next step is the folding and pasting of the paper to the remaining end portion of the bottom, and this is done by the second arm $p^3$, to which the mandrel is moved by the revolution of the shaft C and for the action of which the mandrel itself is revolved by the cam-operated segment O to present such end to the arm. Immediately before the latter operates, however, the finger $V^3$ is moved against the box-bottom to insure that the same is in proper position relative to the frame before its complete attachment to the same, and during the operation of said arm and finger the roller $y^3$ of lever $Y^3$ passes over the paper upon the end and the side of the box not previously acted upon by the roller. The mandrel is now moved to the third arm $p^3$ and at the same time is revolved through a quarter-circle by the cam-operated segment, so as to present the box for the attachment of the paper to one of the side portions of the bottom, and said arm is actuated to fold the paper upon and paste it to such portion of the bottom. The paper is pasted to the remaining side portion of the bottom by the fourth arm $p^3$, to which it is next moved and for the action of which the mandrel is revolved through a half-circle. The next operation is the turning of the paper within the box and affixing the same to the inner surfaces of the sides and ends thereof, and such is done by the co-operation of the ejector-plates $V^4$ and $V^4$, the block $A^4$, and the four plates or blades $k^5$ and $k^5$ in the manner heretofore fully described. After this operation has been performed the mandrel carries the box to the roller $b^5$ of the lever $B^5$ and is revolved by the cam-operated segment O, so as to present the sides and ends in succession to the action of said roller to give a finishing-pressure to the now complete box. The box is next removed from the mandrel by the ejectors $V^4$ and $V^4$, and falling into the chute $G^5$ is removed from the machine.

It will, of course, be understood that the work of making boxes is simultaneously going on with the other mandrels, and at the time a complete box is being removed from one mandrel the five others have boxes in the various stages of manufacture.

While we have described the use of wood veneer with our machine, we, of course, do not limit ourselves only to the manufacture of boxes from such or any particular material; and we also wish it understood that we do not limit ourselves to the precise construction of parts shown and described, as changes may be made in many particulars which will involve no departure from our invention.

Having thus described our invention, what we claim is—

1. In a box-making machine, the combination of a rotatable mandrel, means to co-operate therewith to form a box, and means to rotate said mandrel in opposite directions, during a box-forming operation, substantially as and for the purpose specified.

2. In a box-making machine, the combination of a rotatable mandrel, a series of devices to co-operate therewith to form a box, a carrier to move the mandrel to said devices in succession, and means to rotate the mandrel in opposite directions, substantially as and for the purpose shown.

3. In a box-machine, the combination of a traveling series of rotatable mandrels, a series of devices to co-operate with each of the same to form a box, to which each mandrel moves in succession, and means to rotate each mandrel in opposite directions, substantially as and for the purpose set forth.

4. In a box-making machine, the combination of a rotatable series of rotatable mandrels, sources of supply of material for forming boxes, a series of devices to co-operate with each mandrel to form a box to which each mandrel moves in succession, and means to rotate each mandrel in opposite directions, substantially as and for the purpose described.

5. In a box-making machine, the combination of a rotatable mandrel, a pivoted part connected with said mandrel to rotate the same, means to co-operate with the mandrel to form a box, and means to vibrate said pivoted part during a box-forming operation, substantially as and for the purpose specified.

6. In a box-making machine the combination of a rotatable mandrel, a pinion connected therewith, a pivoted segment meshing with the pinion, to vibrate said segment, means to co-operate with the mandrel to form a box, and means to vibrate said segment during a box-forming operation, substantially as and for the purpose shown.

7. In a box-making machine, the combination of a rotatable carrier, a series of mandrels that are journaled in said carrier, a vibratory part connected with each mandrel, and pivoted to the carrier, and means to vibrate said part, substantially as and for the purpose set forth.

8. In a box-making machine, the combination of a rotatable carrier, a series of shafts journaled therein, a mandrel upon each shaft, a pinion on each shaft, a segment meshing with each pinion, and pivoted to the carrier, cam mechanism to vibrate the segments, and a series of devices to co-operate with the mandrels to form boxes, substantially as and for the purpose described.

9. In a box-making machine, the combination of a source of supply of blanks to form the sides and ends of a box, a source of supply of box-bottoms, a source of supply of paper, a mandrel or former movable from one of said sources of supply to the other, in succession, means for folding a blank upon the mandrel to form the box sides and ends, means for placing a bottom in the path of the folded blank, means for simultaneously attaching the paper to the bottom and said folded blank, and means for completing the folding and attaching of the paper to the latter and the bottom, substantially as and for the purpose specified.

10. In a box-making machine, the combination of means to form the frame composed of sides and ends, and for placing a bottom in position for attachment thereto, means for securing paper to adjacent portions of the frame and bottom, and mechanism acting after the frame and bottom have had the paper attached thereto, for placing the bottom in its final position in the complete box and suitably folding and securing the paper to the latter, substantially as and for the purpose shown.

11. In a box-making machine, the combination of the mandrel, or former, a source of supply of paper, a knife, and means to move the paper to the knife to sever it and to place it in contact with a blank on the mandrel, substantially as and for the purpose shown.

12. In a box-making machine, the combination of the mandrel or former, a source of supply of paper, a knife, and a pivoted arm to move the paper against the knife to sever it and carry it in contact with a blank on the mandrel, substantially as and for the purpose set forth.

13. In a box-making machine, the combination of the mandrel or former, means for forming box ends and sides thereon, a support for holding a box-bottom in position for attachment to the blank on the mandrel, means for attaching paper to said blank and the bottom, and means for moving the bottom on its paper connection with the ends and sides blank on the mandrel to place the same in its proper relative position in the finished box, substantially as and for the purpose described.

14. In a box-making machine, the combination of the traveling mandrel, means for forming box ends and sides thereon, a hopper for box-bottoms, a support for one end of a blank fed from the hopper, relative to which the mandrel moves, means for attaching paper to the blank on the mandrel and to the box-bottom, and arms to engage the latter as the mandrel moves along, substantially as and for the purpose specified.

15. In a box-making machine, the combination of the traveling mandrel, means for forming box ends and sides thereon, a hopper for box-bottoms, a support for one end of a blank fed from the hopper, relative to which the mandrel moves, a knife, an arm to move paper against the latter and into contact with the blank on the mandrel and the bottom, and arms to engage the latter as the mandrel moves along, substantially as and for the purpose set forth.

16. In a box-making machine, the combination of the traveling mandrel, its carrier, a finger, a cam-arm and spring for moving the finger relative to the path of the mandrel, and a part carried by the carrier to engage the cam-arm, substantially as and for the purpose shown.

17. In a box-making machine, the combination of the traveling mandrel, its carrier, a folding-finger, means to move the same, and a supplemental finger connected therewith, substantially as and for the purpose described.

18. In a box-making machine, the combination of the traveling mandrel, its carrier, a folding-finger, a supplemental, bottom-engaging finger, connections between it and the folding-finger, a spring and cam-arm for moving said fingers relative to the path of the mandrel, and a part on the mandrel-carrier to engage the cam-arm, substantially as and for the purpose specified.

19. In a box-making machine, the combination of the traveling mandrel, its carrier, the pivoted finger, the pivoted cam-arm, a spring connected to said finger and to the cam-arm, connections between the latter and the finger, and a part on the mandrel-carrier to engage said cam-arm, substantially as and for the purpose shown.

20. In a box-making machine, the combination of a mandrel, means for forming a box part thereon, means for folding paper on the exterior of the box part, and means for folding and securing the paper on the interior of the box part, comprising, a device for sliding the box part off the mandrel, fingers for turning the paper across the open end of the box part, and a follower for pushing the box part back on the mandrel, substantially as and for the purpose described.

21. In a box-making machine, the combination of a mandrel, a device for sliding a box part off the same, a follower in line with said box part as it is moved off the mandrel, pivoted fingers movable into and out of the path of said box part, and means to move the follower to replace the box part on the mandrel, substantially as and for the purpose specified.

22. In a box-making machine, the combination of a mandrel, a device for sliding a box part off the same, a follower in line with the box part as it is moved off the mandrel, a spindle to which the follower is attached, pivoted fingers movable into and out of the path of the box part, a collar on the spindle engaging said fingers to move them in one direction and a spring or springs to move them in the opposite direction, substantially as and for the purpose shown.

23. In a box-making machine, the combination of a mandrel, a device for sliding a box part off the same, a follower in line with the box part, as it is moved off the mandrel, a spindle to which the follower is attached, cam mechanism for moving the spindle, pivoted fingers movable into and out of the path of the box part, a collar on the spindle engaging said fingers, a sleeve on the spindle also engaging the fingers, and a spring connecting each finger and said sleeve, substantially as and for the purpose set forth.

24. In a box-making machine, the combination of a mandrel, a device for sliding a box part off the same, a follower in line with the box part as it is moved off the mandrel, means for reciprocating said follower, a support for the box part when it is moved off the mandrel, and fingers for folding the covering-paper across the end of the box part, substantially as and for the purpose described.

25. In a box-making machine, the combination of the traveling mandrel, devices for folding within the box part the covering-paper, and a carrier for said devices that moves along with the mandrel, substantially as and for the purpose specified.

26. In a box-making machine, the combination of the rotatable series of mandrels, devices for folding within the box part the covering-paper, and an arm carrying said devices that is pivoted concentric with the series of mandrels, substantially as and for the purpose shown.

27. In a box-making machine, the combination of a traveling mandrel or former, a hopper for blanks to form the sides and ends of the box, mechanism for feeding such blanks one at a time into the path of the mandrel, the movable fingers in the path of the mandrel to fold the blanks thereon, a hopper containing box-bottoms, mechanism for feeding bottoms one at a time therefrom, a source of supply of paper, means for applying paste or glue to such paper, means for affixing the free end of the paper to the folded blank upon the mandrel and to the fed-out box-bottom, a paper-cutting mechanism, a series of arms for folding and pasting the paper to the box-bottom, and devices for folding and pasting the paper against the interior of the box, substantially as and for the purpose described.

28. In combination with a hopper, the shouldered feeding-piece movable across the bottom of the same, having its shouldered portion grooved, and a part at the exit side of the hopper to project into the groove of the feeding-piece, substantially as and for the purpose specified.

29. In combination with a hopper, the shouldered feeding-arm movable across the bottom of the same, having a groove in the shouldered portion, and a plate having a rib to project into such groove, and pressed yieldingly toward the arm, substantially as and for the purpose shown.

In testimony that we claim the foregoing we have hereunto set our hands this 15th day of July, 1895.

CHARLES LOYENS.
ANDERS PAULSON.

Witnesses:
JOS. JONKERS,
H. P. TEURLINGS.